Figure 11:
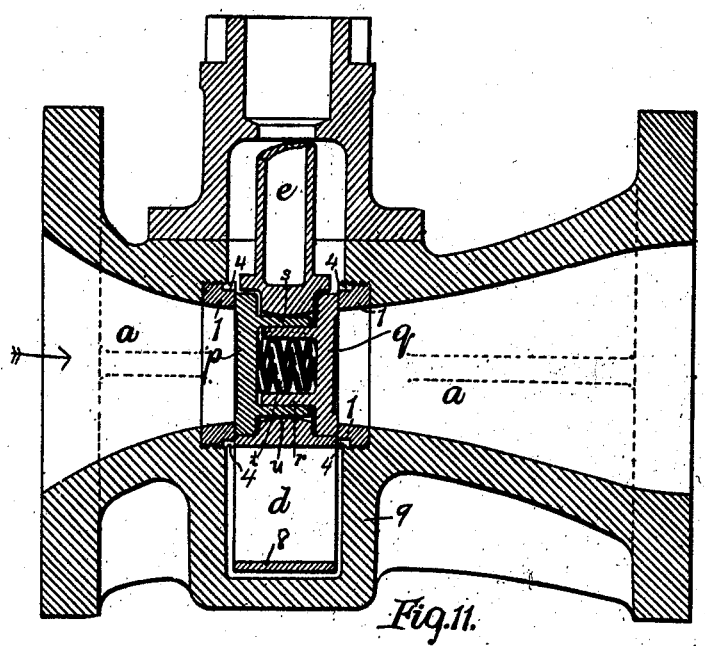

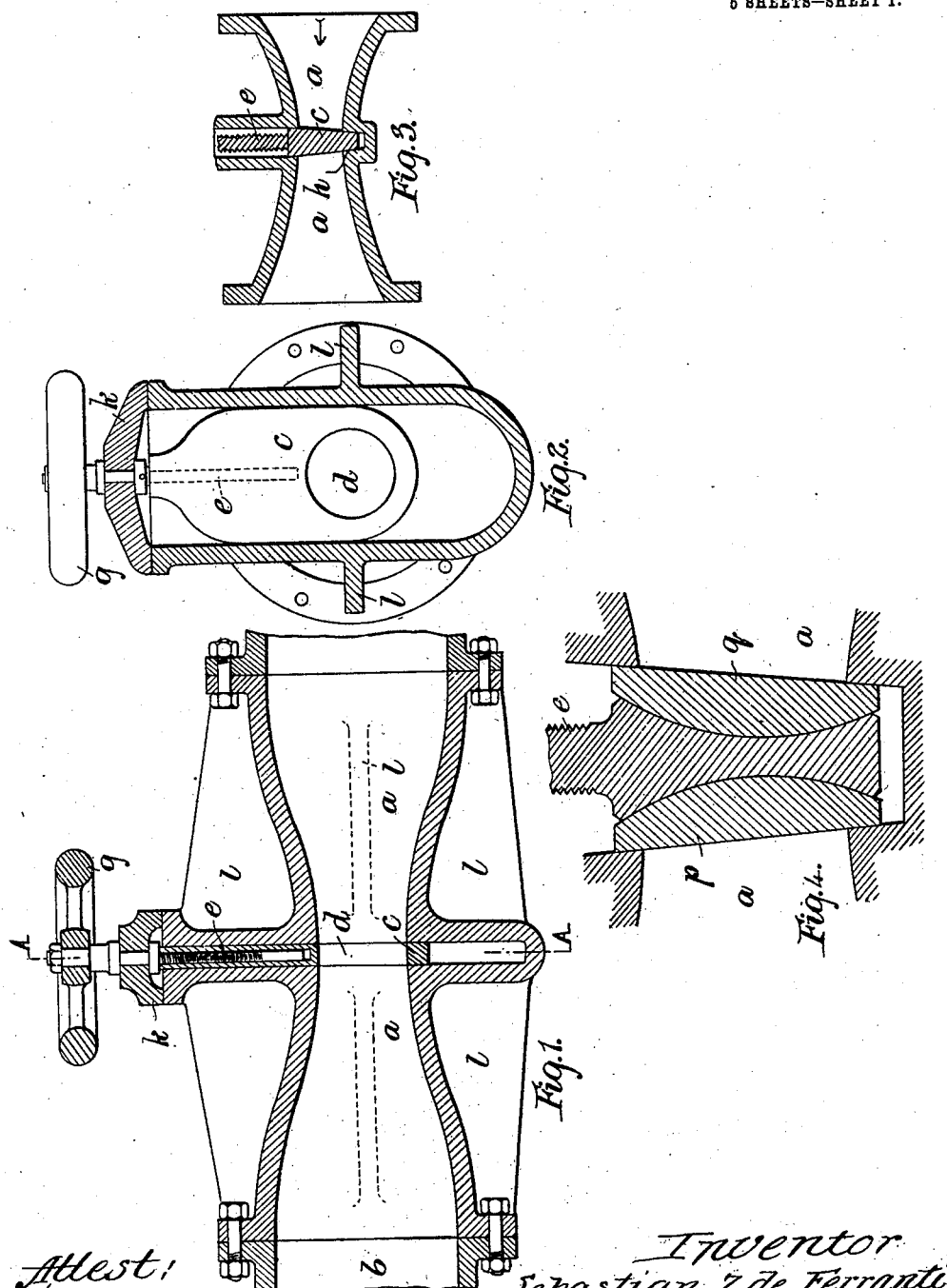

No. 842,393. PATENTED JAN. 29, 1907.
S. Z. DE FERRANTI.
FLUID CONTROLLING DEVICE.
APPLICATION FILED SEPT. 11, 1905.
5 SHEETS—SHEET 2.
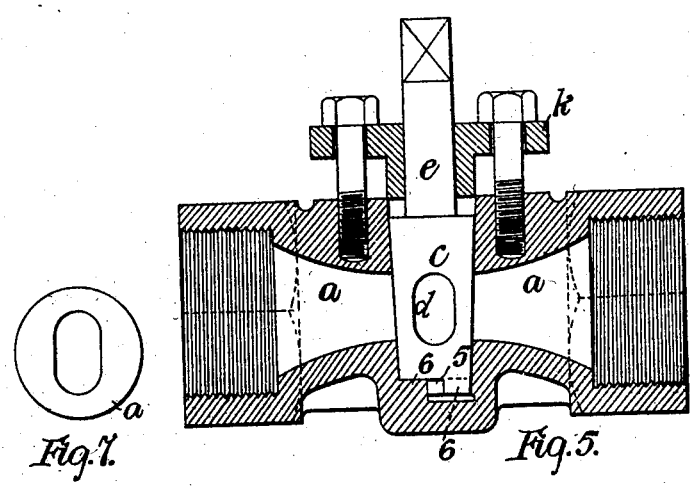
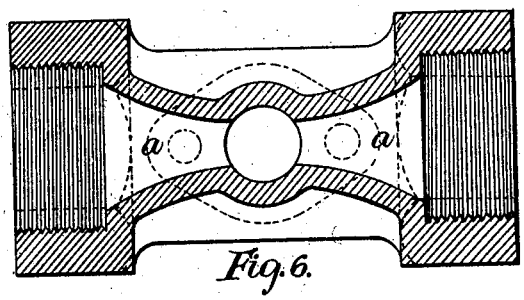

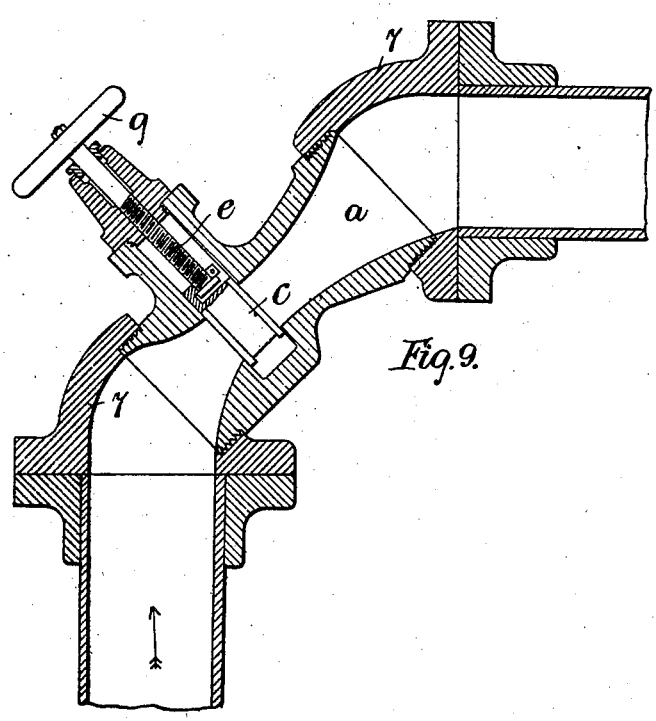

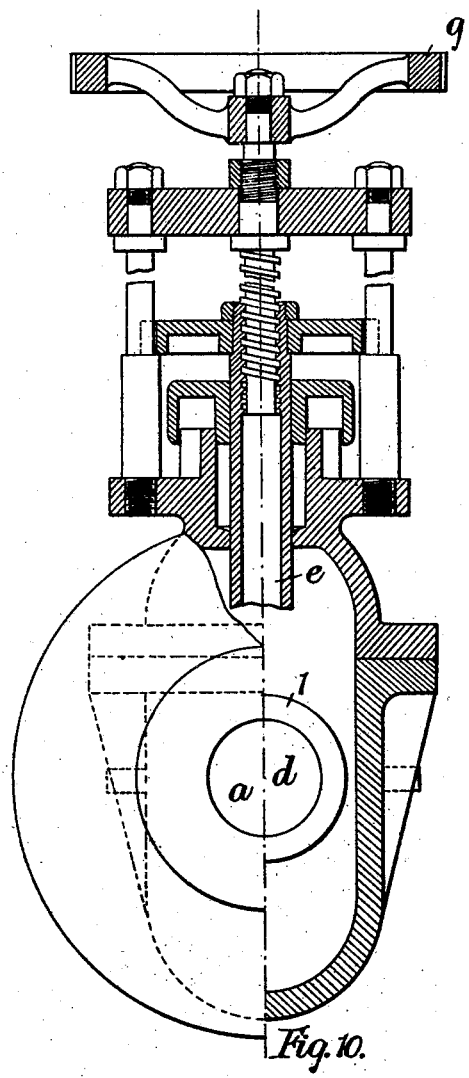

No. 842,393. PATENTED JAN. 29, 1907.
S. Z. DE FERRANTI.
FLUID CONTROLLING DEVICE.
APPLICATION FILED SEPT. 11, 1905.

5 SHEETS—SHEET 5.

Attest:
C. S. Middleton
L. B. Middleton

Inventor
Sebastian Z. de Ferranti
By Thos. Middleton Donaldson
Att'ys

UNITED STATES PATENT OFFICE.

SEBASTIAN ZIANI DE FERRANTI, OF LONDON, ENGLAND.

FLUID-CONTROLLING DEVICE.

No. 842,393.  Specification of Letters Patent.  Patented Jan. 29, 1907.

Application filed September 11, 1905. Serial No. 278,030.

*To all whom it may concern:*

Be it known that I, SEBASTIAN ZIANI DE FERRANTI, a subject of the King of Great Britain and Ireland, residing at 31 Lyndhurst road, Hampstead, London, N. W., England, have invented certain new and useful Improvements in and Relating to Fluid-Controlling Devices, of which the following is a specification.

My invention relates to devices for regulating the flow of elastic and inelastic fluids, such as steam, air, or water. Such a controlling device constructed in accordance with my invention will, as compared with devices at present used, be found to present a path offering substantially no greater resistance to the passage of the fluid, and yet at the same time the valve is of much smaller dimensions and weight. Moreover, with equally good fitting the device has less loss by leakage, and being exposed to considerably-reduced total pressure, owing to the conical wall of the inlet portion receiving a part of the total longitudinal pressure in the pipe, requires less power to operate it, as will appear from the following description.

My invention consists in employing a controlling valve or cock of small dimensions in relation to the conduit to be controlled in combination with leading in and out passages of such configuration as to produce the required increased and decreased velocity of flow without substantial eddy loss. In other words, my invention may be defined as a Venturi tube having a controlling device disposed at the constricted portion, and I wish it to be understood that under this definition I intend to include not only a duct composed of two strictly-conical frusta having their small ends contiguous or adjacent, such as, perforated at the constricted portion, is commonly used in connection with the well-known Venturi water-meter itself, but any duct the cross-section of which diminishes in any other manner to a minimum and then increases, so long as it is adapted, in conjunction with the controlling device, to fulfil an equivalent function as regards the interconversion of velocity and pressure without substantial losses due to eddy-making, distortion, or obstruction of the stream-lines and the like causes.

In applying my invention to the control of inelastic fluids the form of the inlet and outlet pasages or nozzles should vary in a manner which is now well understood in connection with the Venturi water-meter, which may be said to consist of a simple Venturi tube perforated at the constricted portion to produce an aspirating effect. In dealing with elastic fluids, however, I have found the change of form may take place in a more abrupt manner, and consequently some reduction in the length of nozzles may be effected without materially altering the efficiency of the device. In dealing with both classes of fluid it is important, with a view to preventing eddies, that the orifices of the nozzles shall be exactly opposite to one another, and if the valve used is one having a guide-passage it is important that this shall exactly register with the orifices of the nozzles, and I provide accordingly.

Referring now to the accompanying drawings, which illustrate my invention and form part of my specification, Figure 1 is a sectional elevation of a straightway controlling device constructed according to my invention. Fig. 2 is a sectional elevation of the controlling device shown in Fig. 1, the section being taken through the center line A A of that figure. Figs. 3 and 4 are also modifications of the type of controlling device shown in Fig. 1, the valve being of wedge-shaped section. Fig. 5 is a sectional elevation, and Fig. 6 a corresponding horizontal section, of a controlling device provided with a plug-valve. Fig. 7 is an illustration showing the change in the form of the nozzle-orifice of the plug-valve-controlling device shown in Figs. 5 and 6. Fig. 8 is a detail view of a registering arrangement for fixing the position of the plug in the valves shown in Figs. 5 and 6 when the valve is open. Fig. 9 shows a sectional elevation of a right-angled controlling device constructed according to my invention. Fig. 10 is a part-sectional elevation of a controlling device provided with removable seats, Fig. 11 being a corresponding sectional elevation.

In the drawings similar parts are denoted by the same letters.

In carrying my invention into effect according to the form shown in Figs. 1 and 2 I make the valve-opening $d$ of less—say one-half—diameter than the pipe $b$, the flow through which it is desired to control. I form nozzle-passages $a$ leading to and from the valve, the complete duct thus forming a Venturi tube. The outward ends of the nozzle-passages $a$ are of the same diameter as the pipe $b$, and the passage through the structure is of such length and section from point to point as will convert the velocity and pressure of the fluid in the pipe at one side into a correspondingly greater velocity and less pressure at the point where it reaches the valve and then allow it to pass through the valve-opening at maximum velocity, the reverse nozzle reconverting the velocity into pressure. The net loss of pressure with properly-proportioned nozzles leading to and from the valve will be very small, especially if these are accurately machined and polished so as to give the best results.

I may use an ordinary pattern of sluice-valve between the nozzles; but I prefer to use a valve c in the form of a diaphragm-plate commonly called a "gate." At one portion of this plate there is a hole d, leading straight through, and this comes opposite to and connects the two nozzles when the valve is full open and presents a smooth path from nozzle to nozzle. In closing, the diaphragm-plate c is moved across the surfaces by operating a hand-wheel g, attached to a screwed spindle e, which engages with a nut situated in the diaphragm-plate c. A cover k prevents leakage of the working fluid around the spindle e.

When a controlling device constructed in accordance with my invention is inserted in a line of pipes, it will be evident that unless special precautions are taken the stresses induced by changes of temperature, for example, may cause fracture to take place at the throat of the controlling device, owing to the abnormally-reduced size of that part. To avoid this contingency, whether arising from the above or other cause, I strengthen the shell of the controlling device, preferably by providing ribs l, suitably disposed, the number and proportions of which preclude the possibility of fracture.

If in any case it is desired that the fluid should leave the controlling device at a lower velocity than that at which it has reached it, I make the nozzle portion coming from the valve expand to a greater area than that on the other side of the valve, and in this way liquid may be discharged in quantity without its leaving at an inconveniently high rate of flow.

The amount of reduction from the pipe area to the throat area will vary according to the class of fluid dealt with by the controlling device. It may also be varied according to the drop of pressure which is permissible. Thus where a drop of pressure is unimportant the throat may be of considerably smaller area relatively than the example which I have given above, and vice versa.

Fig. 3 is an illustration of the form of valve which may be used when a wedge-shaped valve is desired—as, for instance, when the fluid to be dealt with is cold. In Fig. 3 the gate c is slightly tapered in the fitting part h, thus leaving a small ring clearance round the end of each nozzle when the valve is open. This arrangement will, however, cause some eddying, and to that extent is less advantageous than other valves herein described.

In Fig. 4 the gate is made in three parts, the working faces p and q being of a circular or other suitable shape on their inner sides and resting in correspondingly-formed surfaces. This arrangement allows the gate-faces p and q to accommodate themselves to the working surfaces. In practice it is found that the reduction in area of the inlet-nozzle can take place in smaller length than the increase of area of the outlet-nozzle without materially affecting the efficiency, and in Fig. 3 a controlling device is shown in the construction of which advantage is taken of the above-mentioned result to shorten materially the length of the inlet-nozzle.

My invention may be employed in connection with plug-cocks, as illustrated in Figs. 5, 6, 7, and 8. A plug c is provided having an orifice d of approximately elliptical form. The nozzles a are preferably formed at their larger diameters of circular section, which changes in a gradual manner to a section which exactly corresponds to the plug-cock orifice, this change of section being illustrated in Fig. 7. It is found that it is not essential that the section through the nozzles should be regular throughout the path as long as it varies in a gradual manner and presents no interruption or irregularities of surface which would obstruct the flow of liquid. A packing-gland k of usual construction is provided, so as to prevent leakage along the line of the plug-spindle e, which is provided with projections 5, Fig. 8, at its lower end. The projections 5 engage with stops 6, formed on the plug-cock body, and prevent further rotation of the cock when the orifice of the plug is in exact register with the inner nozzle ends. My invention may be also applied to the construction of right-angled fluid-controlling devices. Thus according to one method I attach to the ends of the controlling device by any suitable means flanges 7, Fig. 9, or other connecting-pieces, the faces of the flanges being inclined at about an angle of forty-five degrees to the axis. In some cases it is desirable to have removable seats, and then I provide seats 1, Figs. 10 and 11, of suitable material and preferably of annular form. These seats are screwed into the valve-body by means of a suitable key-spanner, which is provided with projections engaging with recesses 4 in the seats 1. In Fig. 10 the inner peripheries of the seats form parts of the nozzle-paths. In the form of my invention shown in these figures the gate or valve is made up of three pieces. The working faces p and q are provided, respectively, with a socket-piece s and a spigotpiece r, which engage with one another, as shown, a spring t being interposed in order to press the faces p and q against their seats. An eye u, attached to the spindle e, encircles the socket-piece s, the bearing-surfaces in contact therewith being slightly convex, as shown. The eye u has attached to it a member 8, having a passage-way d therethrough adapted to register with the adjacent seats 1, forming parts of the nozzles a, when the valve is opened. In this form of my invention, as in others hereinbefore described, the valve casing or body 9 is preferably formed integral with the nozzles a, forming Venturi tube.

From the foregoing description it will be evident that my invention lends itself to general application and can be applied to controlling devices for elastic and non-elastic fluids. The facility with which it can be adapted to meet widely-different sets of conditions forms a special feature. Thus it may also be effectively applied to a service-tap, and is especially suitable in those circumstances where it is desired to avoid "splashing"—e. g., owing to the water entering a receiving vessel with a high velocity. In this case by suitably proportioning the outlet-nozzle the water can be made to enter the vessel quietly and with an entire absence of splashing. When the fluid to be dealt with is hot—such, for example, as steam—it is found that the unequal expansion causes warping of the valve-seats. To counteract this defect, I have described and illustrated above gates or valves so constructed as to accommodate themselves to the valve-seats, a form which allows my invention to be applied efficiently to controlling devices for steam or other high-temperature fluids.

A controlling device constructed in accordance with the above principles possesses the following advantages, among others: first, that the weight and cost of the device are substantially decreased; second, that less power is required to operate it, and, third, that the perimeter of leakage is reduced.

Having thus described my invention, what I claim as new, and desire to secure by Letters Patent, is—

1. In combination, a Venturi tube and a fluid-controlling device operatively disposed between the converging and diverging nozzles of said tube.

2. In combination in a pipe-line, a Venturi tube and a fluid-controlling device operatively disposed between the converging and diverging nozzles of said tube, the diameters of the larger ends of said nozzles being about equal respectively to those of the corresponding portions of the pipe-line.

3. In combination, a Venturi tube, the converging nozzle of which is shorter than the diverging nozzle together with a fluid-controlling device operatively disposed between said nozzles.

4. In a pipe-line, a structure comprising a Venturi tube and a fluid-controlling device operatively disposed between the converging and diverging nozzles of said tube, the passage-way through said structure available for fluid flow having smooth bounding surfaces.

5. In a pipe-line, a structure comprising a Venturi tube and a fluid-controlling device operatively disposed between the converging and diverging nozzles of said tube, the passage-way through said structure available for fluid flow having polished bounding surfaces.

6. In a pipe-line, a structure comprising a Venturi tube and a fluid-controlling device operatively disposed between the converging and diverging nozzles of said tube, said structure being of substantially equal strength to that of the pipe-line as regards resistance to certain mechanical stresses.

7. In a pipe-line, a structure comprising a Venturi tube and a fluid-controlling device operatively disposed between the converging and diverging nozzles of said tube, certain parts of said structure being ribbed to maintain the strength of the pipe-line.

8. In combination, a Venturi tube and a fluid-controlling device operatively disposed between the converging and diverging nozzles of said tube, and having a body or casing formed integral with said nozzles.

9. In a pipe-line, a structure comprising a Venturi tube and a fluid-controlling device operatively disposed between the converging and diverging nozzles of said tube, said controlling device including a part having an aperture therethrough; and means for registering said aperture with the adjacent ends of said nozzles.

10. In combination, a Venturi tube and a sluice-valve operatively disposed between the converging and diverging nozzles of said tube.

11. In combination, a Venturi tube and a fluid-controlling device operatively disposed between the converging and diverging nozzles of said tube, said controlling device having a body or casing and a member slidable fluid-tight relatively thereto.

12. In combination, a Venturi tube and valve means operatively disposed between the converging and diverging nozzles of said tube.

In testimony whereof I have signed my name to this specification in the presence of two subscribing witnesses.

SEBASTIAN ZIANI DE FERRANTI.

Witnesses:
W. J. NORWOOD,
WALTER J. SKERTEN.